(12) United States Patent
Drebinger

(10) Patent No.: US 9,527,683 B2
(45) Date of Patent: Dec. 27, 2016

(54) METHOD AND DEVICE FOR CONTROLLING AND/OR REGULATING A FLUID CONVEYOR FOR CONVEYING A FLUID WITHIN A FLUID LINE

(75) Inventor: Konrad Drebinger, Weisendork (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 455 days.

(21) Appl. No.: 14/234,495

(22) PCT Filed: Jul. 11, 2012

(86) PCT No.: PCT/EP2012/063543
§ 371 (c)(1),
(2), (4) Date: Jan. 23, 2014

(87) PCT Pub. No.: WO2013/013974
PCT Pub. Date: Jan. 31, 2013

(65) Prior Publication Data
US 2014/0163724 A1  Jun. 12, 2014

(30) Foreign Application Priority Data
Jul. 25, 2011 (DE) .......................... 10 2011 797 32

(51) Int. Cl.
*A61M 37/00* (2006.01)
*B65G 53/66* (2006.01)
(Continued)

(52) U.S. Cl.
CPC ............... *B65G 53/66* (2013.01); *F04D 27/00* (2013.01); *F04D 27/02* (2013.01)

(58) Field of Classification Search
CPC .......... Y02W 10/37; B65G 53/66; C02F 1/32; A61M 2205/12; A61M 2205/3368; A61M 2205/502; A61M 1/1037; A61M 1/288
See application file for complete search history.

(56) References Cited

U.S. PATENT DOCUMENTS 4,526,513 A   7/1985  Bogel
7,676,283 B2  3/2010  Liepold
(Continued)

FOREIGN PATENT DOCUMENTS

DE   19912588 A1   9/2000
DE   10208676 A1   9/2003
(Continued)

OTHER PUBLICATIONS

Ferreira et al., Ecoanalysis of Variable-Speed Drives for Flow Regulation in Pumping Systems, Jun. 2011, 9 pages.*
(Continued)

*Primary Examiner* — Thuy Dao

(57) ABSTRACT

A method for controlling/regulating a fluid conveyer for conveying a fluid within a fluid line is provided. The method includes the steps, receiving information regarding a setpoint flow rate of the fluid within the fluid line, determining an energy consumption of the fluid conveyer during operation within a working range of the fluid conveyer, controlling the fluid conveyer, with regard to a generated flow of the fluid, on the basis of the information regarding the setpoint flow rate of the fluid within the fluid line in such a way that the setpoint flow rate of the fluid is stained and the energy consumption required for this is minimized, wherein it is taken into consideration that the working range of the fluid conveyer is bounded by a non-linear boundary. Also described is a corresponding device.

14 Claims, 2 Drawing Sheets

(51) Int. Cl.
    *B01D 61/24*         (2006.01)
    *F04D 27/00*         (2006.01)
    *F04D 27/02*         (2006.01)

(56)            References Cited

U.S. PATENT DOCUMENTS

| | | | |
|---|---|---|---|
| 8,516,902 B2 * | 8/2013 | Beavis | B67D 1/0036 |
| | | | 73/861.47 |
| 8,658,043 B2 * | 2/2014 | Wilkins | B01D 61/48 |
| | | | 204/519 |
| 9,027,538 B2 * | 5/2015 | Lepley | F02D 41/0025 |
| | | | 123/525 |
| 9,072,831 B2 * | 7/2015 | Kelly | A61M 1/1696 |
| 9,072,843 B2 * | 7/2015 | Kelly | A61M 1/1696 |
| 2005/0191184 A1 | 9/2005 | Vinson | |
| 2007/0150113 A1 * | 6/2007 | Wang | G05D 7/0641 |
| | | | 700/282 |
| 2009/0320438 A1 * | 12/2009 | Koganezawa | F02C 3/10 |
| | | | 60/39.15 |

FOREIGN PATENT DOCUMENTS

| | | |
|---|---|---|
| DE | 102005006410 A1 | 8/2006 |
| DE | 102007058211 A1 | 6/2009 |
| DE | 102008064491 A1 | 6/2010 |
| GB | 1593361 A | 7/1981 |
| JP | 8014191 A | 1/1996 |
| RU | 2237214 C1 | 9/2004 |
| RU | 2270472 C2 | 2/2006 |
| RU | 2310792 C1 | 11/2007 |

OTHER PUBLICATIONS

Akpan et al., Adaptive predictive control using recurrent neural network identification, 2009, 6 pages.*

* cited by examiner

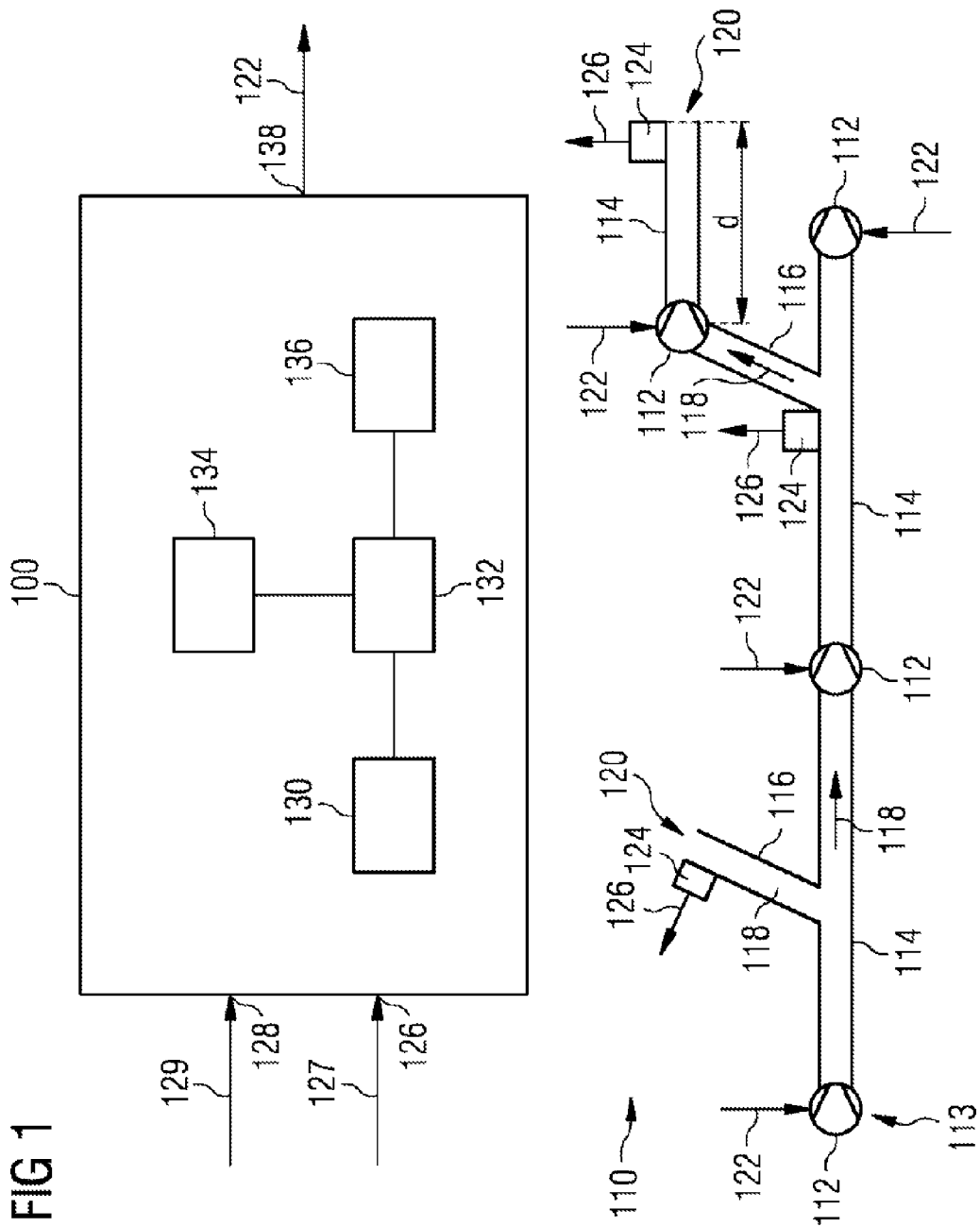

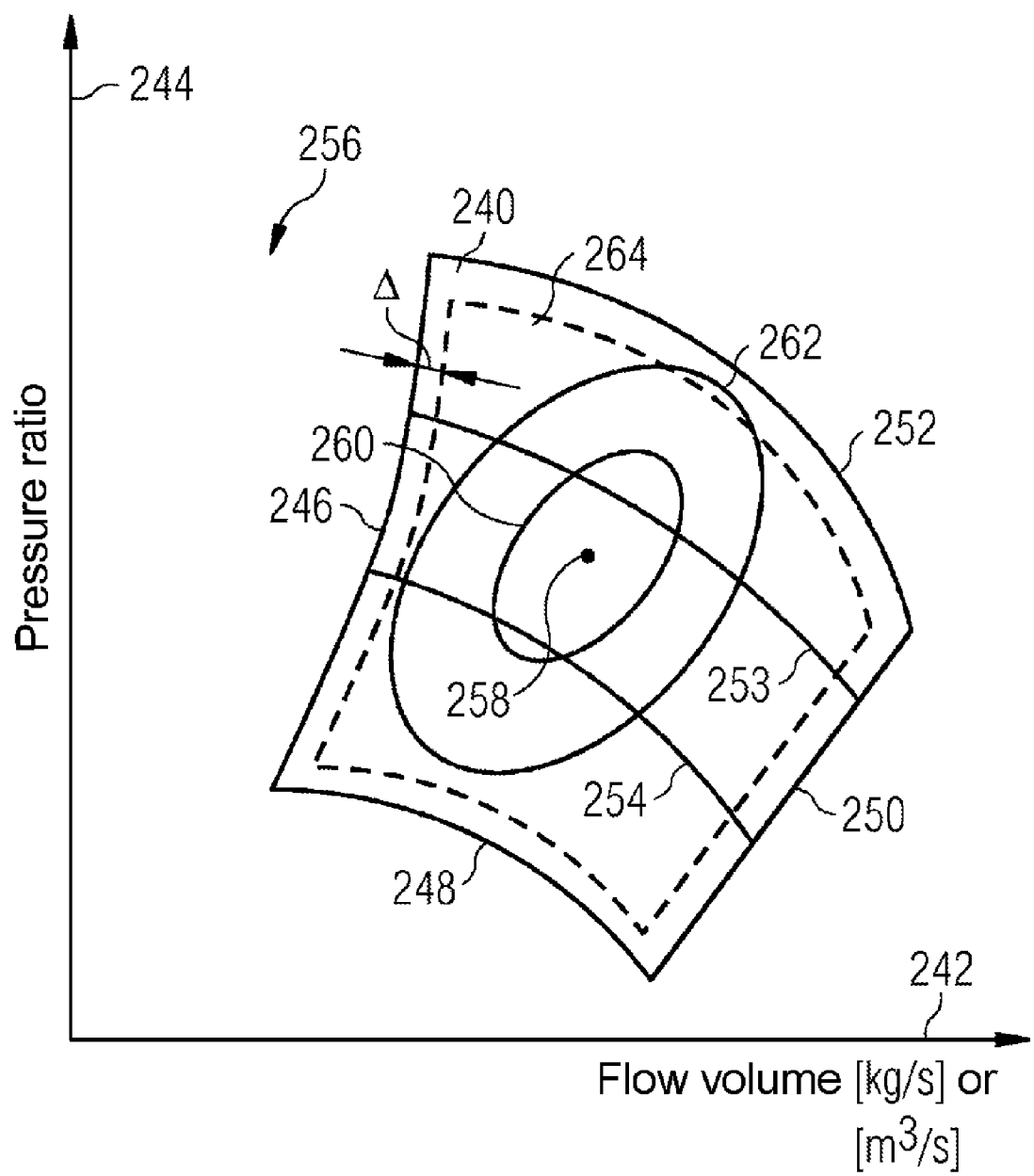

US 9,527,683 B2

METHOD AND DEVICE FOR CONTROLLING AND/OR REGULATING A FLUID CONVEYOR FOR CONVEYING A FLUID WITHIN A FLUID LINE

CROSS REFERENCE TO RELATED APPLICATIONS

This application is the U.S. National Stage of International Application No. PCT/EP2012/063543 filed Jul. 11, 2012 and claims benefit thereof, the entire content of which is hereby incorporated herein by reference. The International Application claims priority to the German application No. 102011079732.7 DE filed Jul. 25, 2011, the entire contents of which is hereby incorporated herein by reference.

FIELD OF INVENTION

The present invention relates to a method and a device for the open-loop controlling/closed-loop controlling of a fluid conveyor for conveying a fluid inside a fluid line, wherein the fluid can especially be gas or oil and the fluid conveyor can be a compressor or a pump.

BACKGROUND OF INVENTION

As a result of the deregulation of the gas market in a large number of countries, a brisk and dynamic gas trading has been created. Gas is traded today like a security. This dynamic of gas trading (in addition to weather influences) has led inter alia to the gas flow having to be planned anew, often daily, by the pipeline operator for the very next day (so-called dispatching). As a further consequence of the deregulation, the gas network operators now compete with each other. In order to optimize its costs and at the same time to optimize profits, the gas network operators are anxious to utilize the pipeline capacity as highly as possible, to observe the contractually agreed calorific values and gas flow volumes, to observe the limits of the compressor operating fields and at the same time to keep the transport costs for the gas as low as possible.

U.S. Pat. No. 7,676,283 B2 discloses a method for optimizing the functionality of a multiplicity of compressor units, wherein the compressor units can be separately engaged and disengaged, wherein energy consumption is optimized.

SUMMARY OF INVENTION

It is an object of the present invention to provide a method and a device for the open-loop controlling or closed-loop controlling of a fluid conveyor, especially a compressor or a pump, for conveying or transporting a fluid, especially a gas or an oil, wherein an operation of a fluid line system is improved especially with regard to energy consumption and in particular works reliably under changing requirements.

This object is achieved by the subjects of the independent patent claims. Advantageous embodiments of the present invention are described in the dependent claims.

According to one embodiment of the present invention, provision is made for a method for the open-loop controlling (which can especially feature closed-loop controlling, wherein a manipulated variable can be issued, for example for controlling the conveyor, and a signal relating to the flow of the fluid can be inputted (fed back)) of a fluid conveyor or fluid transporter (especially a pump or a compressor) for conveying or carrying or transporting (especially for compressing or transporting) a fluid (especially a gas or an oil) inside a fluid line (especially a gas line or an oil line, or a gas line system or an oil line system. In this case, the method features obtaining (for example via an electric signal which is connected to an information source) information (especially in electronic form) about a desired flow volume (especially a flow volume or flow rate to be achieved and, as an option, about a desired pressure which is to be achieved) of the fluid inside the fluid line, wherein this information can especially define a desired flow volume of the fluid at a plurality of points (and/or at a plurality of time points) inside the fluid line. Furthermore, the method features determining (especially featuring modelling, calculating or assessing) energy consumption of the fluid conveyor during operation of the fluid conveyor within a working range of the fluid conveyor, wherein the working range of the fluid conveyor can be defined by means of various operating parameters of the fluid conveyor. Furthermore, the method features the open-loop controlling or closed-loop controlling (especially via feeding of an electric signal, especially of a manipulated variable, or a plurality of manipulated variables, such as a rotational speed) of the fluid conveyor with regard to a flow (and, as an option, especially of a generated pressure) of the fluid (wherein the fluid conveyor during operation transports the fluid, building up a pressure or an impulse transfer according to a fluid flow) based on the information about the desired flow volume of the fluid inside the fluid line in such a way that the desired flow volume of the fluid (especially at the plurality of points at which the desired flow volumes are predetermined) is achieved and the energy consumption (which is required by the fluid conveyor) which is required for this is minimized, wherein the fact that the working range of the fluid conveyor is restricted by non-linear limits is taken into consideration during the controlling (especially during the closed-loop controlling). In this case, the working range of the fluid conveyor can be defined by a set of pairs (especially tuples) of a flow volume and a ratio of a pressure at an inlet and an outlet of the fluid conveyor, wherein the set of pairs is limited by at least one curved characteristic line.

The method can therefore have open-loop control components for the issuing of manipulated variables, and also closed-loop control components for generating the manipulated variables by the use of feedback.

The information can especially also provide information about a desired pressure.

The flow volume can be expressed in standard cubic meters, for example, wherein the gas quality is taken into consideration in order to be able to associate a specific energy content to one standard cubic meter. The flow volume can be expressed, for example, in an energy flow volume, as a result of which a delivery of a defined energy volume is achieved by delivery of a specified quantity of standard cubic meters, wherein the volume depends upon the gas quality. Depending upon gas quality, the energy content of a standard cubic meter fluctuates. The energy content can be specified in Btu (British thermal unit). For a specific energy volume in the form of gas, more standard cubic meters have to be delivered in the case of a lower energy content than in the case of a higher energy content.

In this case, a non-linear limitation can be defined by a curved characteristic line which is therefore not rectilinear. By taking into consideration the non-linear limits of the working range of the fluid conveyor (especially of a compressor in the case in which the fluid is a gas), closed-loop controlling of the fluid conveyor can be improved, especially with regard to energy consumption. Furthermore, the desired flow volume (especially also a desired pressure) can be achieved with higher accuracy since the modelling of the behavior of the fluid inside the fluid conveyor can be modelled with higher accuracy. As a result, a more accurate or more reliable determination of a manipulated variable, or a plurality of manipulated variables, which are issued to the fluid conveyor for the open-loop controlling or closed-loop controlling of the fluid conveyor, therefore becomes possible.

The permissible working range of the fluid conveyor can especially indicate the range of the fluid conveyor within which the fluid conveyor can be operated without causing damage. An operation of the fluid conveyor outside the working range can especially be avoided in order to protect the fluid conveyor against damage or even destruction. Depending upon the embodiment, the working range can also be defined in another way by a set of points, for example by indication of a rotational speed, of a conveyed volume, or purely of the pressure at the inlet and/or purely a pressure at the outlet of the fluid conveyor. In any case, the working range is limited by curved characteristic lines and therefore cannot be exclusively represented by a straight line, or by a plurality of straight lines. In this case, the shape of the curves is taken into consideration during the open-loop controlling or closed-loop controlling of the fluid conveyor. Therefore, the closed-loop controlling of the fluid conveyor can be improved further.

According to one embodiment of the present invention, the method also features obtaining information about an actual pressure (an actually existing pressure at a specific time) and an actual flow volume (an actually existing flow volume at a specific time) of the fluid inside the fluid line, wherein the open-loop controlling or closed-loop controlling of the fluid conveyor is also based on the information about the actual pressure and the actual flow volume of the fluid inside the fluid line.

In this case, the information about the actual pressure and the actual flow volume of the fluid will have been able to be determined, for example, via a measurement, or a plurality of measurements, at one point, or at a plurality of points, along or inside the fluid line. The information about the actual pressure and the actual flow volume can especially be obtained continuously or at regular or irregular intervals (for example very second, every minute, every hour).

The information about the desired flow volume and also the information about an actual pressure and the actual flow volume can especially be obtained via a network (non-wirelessly or wirelessly). By means of the information about the actual pressure and the actual flow volume of the fluid, the open-loop controlling method can be improved further.

According to one embodiment of the present invention, the method also features modelling (especially featuring simulation by establishing physical equations of a flow dynamic, especially differential equations, especially taking into consideration the temperature of the fluid, the wall conditions of the fluid line, the density of the fluid, and suchlike) of the flow (especially of the movement) of the fluid through the fluid line and of the pressure of the fluid inside the fluid line, wherein the open-loop controlling or closed-loop controlling of the fluid conveyor is also based on the modelling of the flow of the fluid through the fluid line (and especially of the pressure of the fluid inside the fluid line).

The modelling of the flow of the fluid through the fluid line (and especially of the pressure of the fluid inside the fluid line) can especially comprise taking into consideration the friction between an inner wall of the fluid line and the fluid, which can especially be described by a non-linearity. The friction between the fluid and the fluid line, or the friction between individual fluid constituent parts, leads to a reduction of the flow and/or to a reduction of the pressure of the fluid inside the fluid line. In particular, the further the fluid inside the fluid line is away from the fluid conveyor, the more a flow of the fluid and/or a pressure of the fluid can be reduced. Taking consideration the friction of the fluid with the wall of the fluid line and taking into consideration the friction of the fluid in alternating interaction, the open-loop controlling or closed-loop controlling of the fluid conveyor can be improved in such a way that the desired flow volume can be achieved at one point, or at a plurality of points inside the fluid line, minimizing energy at the same time.

According to one embodiment of the present invention, the flow of the fluid through the fluid line and the pressure of the fluid inside the fluid line is modelled using a partial non-linear differential equation system. With the partial differential equations, the entire pipeline, including friction, can be modelled. Therefore, friction of the fluid with a wall surface of the fluid line can especially be specified or modelled, or simulated, in order to improve an open-loop controlling or closed-loop controlling of the fluid conveyor.

According to one embodiment of the present invention, the open-loop controlling or closed-loop controlling of the fluid conveyor is also based on a fluid volume difference between the desired flow volume and the actual flow volume (especially at a plurality of points of the fluid line). The fluid volume difference can represent an error signal of the flow volume, wherein the open-loop controlling or closed-loop controlling of the fluid conveyor is designed in such a way that the error signals are minimized. As a result, the closed-loop controlling of the fluid conveyor can be simplified and improved.

According to one embodiment of the present invention, the information about the desired flow volume is obtained over a time period (for example 0 sec.-10 sec., 0 sec.-1 min., 0 sec. to 10 min.) and the information about the actual flow volume is obtained (especially measured or determined) over the (same) time period, wherein the flow volume difference is summed (especially integrated) over the time period in order to obtain a flow volume difference sum, wherein the open-loop controlling or closed-loop controlling of the fluid conveyor is also based on the flow volume difference sum.

For carrying out the sum forming or integration of the flow volume difference, an integration element (especially an electronic module) of a conventional PI controller can be used. As a result, the open-loop controlling method of the fluid conveyor can be simplified and/or improved.

According to one embodiment of the present invention, the determining of the energy consumption of the fluid conveyor features determining (or taking into consideration) the energy consumption of the fluid conveyor when being engaged and/or disengaged.

The energy consumption of the fluid conveyor when being engaged and/or disengaged is especially taken into consideration when the required energy consumption is being minimized. In this case, therefore, an actual or current state of the fluid conveyor (engaged or disengaged) can be taken into consideration. If, for example, it should become apparent that a disengaging and subsequent engaging has a higher energy consumption than a continuous running of the fluid conveyor at lower throughput or lower capacity, the fluid conveyor can be operated at the lower capacity without disengaging it and subsequently engaging it again. As a result, the open-loop controlling or closed-loop controlling of the fluid conveyor can be further improved, especially with regard to minimizing the energy consumption, wherein the obtaining of the desired flow volume can be ensured at the same time.

According to one embodiment of the present invention, a distance between the fluid conveyor and a point along the fluid line at which the desired flow volume is to be achieved is taken into consideration in order to open-loop control/closed-loop control the fluid conveyor. The greater the distance is, the greater are the dead times (e.g. time difference between the issuing of a manipulated variable to the conveyor and corresponding establishing of an altered fluid flow) which can occur. Taking into consideration these dead times which can occur can improve the open-loop controlling method/closed-loop controlling method in order to actually achieve especially the desired flow volume.

According to one embodiment of the present invention, one secondary condition of a set of secondary conditions is taken into consideration during the open-loop controlling/closed-loop controlling of the fluid conveyor, wherein the set of secondary conditions comprises: avoiding a pressure in the fluid line which lies above a maximum line pressure (especially in order to prevent damage to the fluid line); avoiding a pressure in the fluid conveyor which lies above a maximum conveyor pressure (especially in order to prevent damage to the fluid conveyor); and distancing the working point (the operating point at which the fluid conveyor is operated, especially definable by rotational speed, flow rate or established pressure ratio at the inlet or at the outlet of the fluid conveyor) from a limit line of the working range which especially limits the working range of fluid volumes which lie below the working range (i.e. have smaller flow volumes than the working range). In this way, convergence upon a limit line, which defines the transition to a surge range, is especially avoided. A surge can occur if the compressor exit pressure is excessively high with regard to the flow through the compressor or compression machine. The flow can change extremely rapidly with the occurrence of a sudden change in the load which is to be overcome by the compressor. If the surge is not prevented, the compression machine or compressor can be destroyed. Conventionally, in the case of an impending surge, valves would automatically open. By the closed-loop controlling of the fluid conveyor according to this embodiment of the invention critical working conditions of the fluid conveyor can be avoided by the fluid conveyor being operated only in the permissible working range. In this way, the closed-loop controlling of the fluid conveyor can be improved and be simplified without involving the risk of damage to the fluid conveyor.

According to one embodiment of the present invention, the method also features obtaining further information about a further desired flow volume of the fluid, wherein the desired flow volume is different from the further desired flow volume, wherein the open-loop controlling/closed-loop controlling of the fluid conveyor is also based on the further desired flow volume.

The desired flow volume can especially define a first desired state and the further desired flow volume can define a second desired state. As a result, closed-loop controlling of the fluid conveyor enables transferring from a first desired state to a second desired state. The first desired state and the second desired state can be defined in this case via defined desired flow volumes at a multiplicity of delivery points of the fluid in each case. As a result, a dynamically changing flow configuration and pressure configuration inside the fluid line can be achieved by means of corresponding open-loop controlling or closed-loop controlling of the fluid conveyor (or especially of a multiplicity of fluid conveyors). According to one embodiment of the present invention, the fluid is a gas and the fluid conveyor is a compressor. In this case, the compressor can driven for example by an electric motor or especially by a gas turbine (which, for example, can be driven by means of the fluid, wherein the drive by means of the fluid is taken into consideration in the energy consumption of the fluid conveyor). As a result, a control method for the open-loop controlling/closed-loop controlling of a compressor, or a plurality of compressors, of a gas line system can be provided.

According to one embodiment of the present invention, the fluid is an oil and the fluid conveyor is a pump, especially an electric pump, as a result of which a method for the open-loop controlling/closed-loop controlling of a pump of an oil line system is provided.

According to the embodiment of the present invention, the obtaining of information about the desired flow volume of the fluid inside the fluid line features obtaining (especially via an electric signal, for example via a wireless or non-wireless network) information about a desired flow volume of the fluid at a multiplicity of points inside or on the fluid line, especially at a multiplicity of different times.

As a result, a desired state can be specified more accurately. In this case, the method also features determining an energy consumption of at least one further fluid conveyor (or of a multiplicity of further fluid conveyors) during operation within a further working range (or within a multiplicity of further working ranges) of the further fluid conveyor; and open-loop controlling/closed-loop controlling of the fluid conveyor and/or of the at least one further fluid conveyor (or of the multiplicity of the further fluid conveyors) with regard to a generated pressure and flow of the fluid based on the information about the desired flow volume of the fluid at the multiplicity of points of the fluid line in such a way that desired flow volumes of the fluid at the multiplicity of points are achieved and the energy consumption, which is created by the fluid conveyor and the at least one further fluid conveyor, which is required for this, is minimized. As a result, a complex fluid line system can be optimally operated by means of open-loop controlling/closed-loop controlling of a multiplicity of fluid conveyors with regard to an overall energy consumption.

For the person skilled in the art, it is apparent that features which have been disclosed, described or used individually or in any combination in relation to a method for the open-loop controlling/closed-loop controlling of a fluid conveyor can be similarly used (individually or in any combination) for a device for the open-loop controlling/closed-loop controlling of a fluid conveyor according to an embodiment of the present invention, and vice versa.

According to one embodiment of the present invention, provision is made for a device for the open-loop controlling/closed-loop controlling of a fluid conveyor for conveying a fluid inside a fluid line, wherein the device has: an input for obtaining information about a desired flow volume of the fluid inside the fluid line; a determination module for determining an energy consumption of the fluid conveyor during operation within a working range of the fluid conveyor; and a control module for the open-loop controlling/closed-loop controlling of the fluid conveyor with regard to a generated pressure and flow of the fluid based on the information about the desired flow volume of the fluid inside the fluid line in such a way that desired flow volumes of the fluid are achieved and the energy consumption which is required for this is minimized, wherein it is taken into consideration during the controlling that the working range of the fluid conveyor is restricted by a non-linear limit. In this case, the working range of the fluid conveyor can be defined by a set of pairs (especially tuples) of a flow volume and a ratio of a pressure at an inlet and at an outlet of the fluid conveyor, wherein the set of pairs is limited by at least one curved characteristic line (see FIG. 2).

Provision can also be made for a fluid conveyor system which has a fluid line, a fluid conveyor and the device for the open-loop controlling/closed-loop controlling of the fluid conveyor. In this case, the device for the open-loop controlling/closed-loop controlling of the fluid conveyor can be arranged remotely from the fluid line and the fluid conveyor, wherein a communication between the device for the open-loop controlling/closed-loop controlling of the fluid conveyor and said fluid conveyor can be effected via a network and measured values from measurement sensors on the fluid line can also be transmitted via a network to the device for the open-loop controlling/closed-loop controlling of the fluid conveyor.

Reference is made to the fact that embodiments of the invention have been described with reference to different subject matters of the invention. In particular, some embodiments of the invention are described by device claims and other embodiments of the invention are described by method claims. To the person skilled in the art, however, it becomes immediately clear in the text of this application, if not explicitly indicated otherwise, that in addition to a combination of features which are associated with one type of subject matter of the invention, any combination of features which are associated with different types of subject matter of the invention is also possible.

Additional advantages and features of the present invention are to be gathered from the following exemplary description of currently preferred embodiments. The individual figures of the drawing of this application are only to be seen as being schematic and not as being true to scale.

Embodiments of the invention are now explained with reference to the attached drawings. The invention is not restricted to the illustrated or described embodiments.

BRIEF DESCRIPTION OF THE DRAWINGS

FIG. 1 schematically illustrates a fluid conveyor system which has a device for the open-loop controlling/closed-loop controlling of a fluid conveyor according to an embodiment, and also illustrates a fluid line system with a multiplicity of fluid conveyors and measurement sensors;

FIG. 2 illustrates a graph for defining a working range of a fluid conveyor according to an embodiment of the present invention.

DETAILED DESCRIPTION OF INVENTION

FIG. 1 illustrates a fluid conveyor system, especially a gas conveying system, which has a device 100 for the open-loop controlling/closed-loop controlling of a fluid conveyor according to an embodiment of the present invention, and also illustrates a gas line system 110 with a multiplicity of compressors 112 which are controlled by the device 100 for the open-loop controlling/closed-loop controlling of a fluid conveyor. The device 100 for the open-loop controlling/closed-loop controlling of a fluid conveyor can also be referred to as a non-linear model-based predictive controller with a series-connected I-component (integral-action component).

The gas line system 110 comprises a multiplicity of fluid line sections 114 and branches 116, which branch from the line sections 114, in order to feed fluid or gas 118, flowing in the gas line system 110, to specified delivery points 120. The fluid 118, especially a gas, is especially to be delivered at the delivery points 120 at specified times at specified flow volumes or flow rates.

In order to achieve the desired flow volumes at the delivery points 120 at the predetermined time points, the gas line system 110 is equipped with a multiplicity of compressors 112 which transport the gas 118, as a result of pressure application, through the line sections 114 and branches 116 in order to reach the delivery points 120. In the process, the compressors 112 are controlled via data lines 122 by the non-linear model-based predictive controller 100.

Compressors or pumps do not need to be, or are not able to be, placed at the end of the gas lines 114, 116 (i.e. just before the delivery points 120).

The compressor 112, however, is arranged directly at, or close to, a feed point 112 (to which gas is fed) since gas has to be initially pressurized at feed points.

The gas line system 110 also comprises a multiplicity of flow sensors, pressure sensors and temperature sensors 124, which measure the actual pressure, the actual flow volume or flow rate and the actual temperature of the gas 118 at the delivery points 120, or also at other points or places along, or in, the gas line 114, 116 and issue electric signals via signal lines 126.

Via the data line 126, information about an actual flow volume, an actual pressure and actual temperature at the multiplicity of delivery points 120 is fed to the predictive controller 100, which is illustrated in FIG. 1. Furthermore, via a data line 129 or an input 129, information 128 about a desired flow volume (also about a desired pressure as an option) of the gas 118 at the multiplicity of delivery points 120 is fed to the predictive controller 100.

Based on the information which is fed via the inputs 128, 126, the predictive controller 100 forms a flow-volume difference signal between the desired flow volume and actual flow volume and feeds these differences to an integration element 130. The integral-action components (one per delivery point) can be entered in the model of the predictive controller 100 as additional states. The integration element 130 can also be arranged at another point in the signal processing. The integration element 130 integrates or sums the pressure difference signal and/or the flow difference signal over a specific time period in order to obtain a pressure difference sum and/or a flow volume difference sum. These summed signals are then fed to a mathematical pipeline model processor 132 which can access a dynamic optimization algorithm 134 (for minimizing the energy consumption and for definition of the working range of the compressor 112).

Furthermore, the processor 132 accesses different optimization criteria and secondary conditions which can be retrieved in a data structure 136 and which can especially comprise compressor characteristics including surge lines, maximum operating pressures, contractual delivery conditions, weighting factors and other things.

The secondary conditions 136 can especially define a working range 240, as is illustrated in the graph in FIG. 2 and as is explained in detail below.

The predictive controller 100 subsequently calculates a manipulated variable, or a plurality of manipulated variables, such as rotational speed of the compressor 112, and issues them via the output 138 which is connected to the data input lines 122 of the compressor 112. The manipulated variables, via the data lines 122, therefore perform open-loop controlling/closed-loop controlling of the multiplicity of compressors 112 in order to conduct an operation of the gas line system 110 for achieving desired states at the delivery points 120 while minimizing the energy consumption.

The fluid conveyor system of FIG. 1 can be designed for conveying or transporting oil or gas. In the case of oil, the compressors 112 are to be replaced by pumps.

FIG. 2 shows a graph with an abscissa 242, which indicates the flow volume of the gas 118 in a compressor 112, and an ordinate 244, which indicates the pressure ratio (ratio of a pressure at an inlet and at an outlet) of the compressor 112. A working range 240, which defines a permissible range of an operation of the compressor 112, is restricted by means of limit lines 246, 248, 250 and 252. The limit line 252 especially extends along a maximum rotational speed of the compressor 112. A further line 253 extends along a lower rotational speed of the compressor, line 254 extends along an even lower rotational speed of the compressor 112 and the limit line 248 of the working range 240 extends along a minimum rotational speed of the compressor 112.

A range 256 beyond the limit line 246 represents an unstable range of operation of the compressor 112 (or surge range) and has to be avoided. The point 258 represents an optimum working point with the best efficiency of the compressor 112. The lines 260 and 262 represent lines of equal efficiency, wherein the efficiency which is associated with the line 260 is higher than the efficiency which is associated with the line 262. According to one embodiment of the present invention, a distance A from the limit lines 246, 248, 250, 252 is observed in order to operate the compressor 112. In particular, the compressor 112 is therefore operated only in a sub-range 264 of the working range 240 in order to reduce the risk of damage to the compressor. A ratio of an area of the sub-range 264 and the working range 240 can lie between 0.8 and 0.99.

The compressor 112 (inclusive of the limits of the working range 240) and the pipeline friction itself have a non-linear characteristic and the pipeline can have a dead time characteristic with regard to the pressure and the flow rate. In order to regulate the energy consumption of the compressor 112 on the one hand, at the same time taking into consideration the non-linear limits of the working range 240, provision is made for a multi-variable controller 100 which optimizes the energy consumption while taking into consideration the limit of the compressor working range (and the maximum operating pressure) and can effectively deal with dead times. Non-linear MPC controls (a model-predictive approach, MPC—Model Predictive Control, in English) are in the position to effectively solve this problem.

In contrast to conventional linear MPC controllers, by using the non-linear variant of the MPC the pipeline can be operated more accurately and closer to desired limit values. The non-linear MPC concept 100 which is presented here is based on the non-linear model of the pipeline 114, 116 and of the compressor 112. The limits of the compressor 112 are not linearized but simulated by non-linear functions. The pipeline 114, 116 can be described by non-linear partial differential equations (e.g. Weimann: Modelling and Simulation of the Dynamics of Gas Distribution Networks with regard to Gas Network Control and Gas Network Monitoring, Dissertation of TU (Technical University) of Munich, Department of Electrical Engineering, 1978) or can be modelled in combination with the compressor as the Wiener-Hammerstein model (e.g. Wellers: Non-linear Model-supported Predictive Control on the basis of Wiener-Hammerstein Models, VDI (Association of German Engineers) publishing house, progress report, series 8, No. 742, 1998).

The actual optimization criterion in the main comprises the energy consumption of the individual compressors. Secondary conditions 136 can be:

the margin Δ of the compressor to the surge limits (surge line, in English). As a result, the "anti-surge" controls can be replaced by safety switches and safety valves the maximum operating pressure (MAOP=maximum operating pressure, in English) of the pipeline and the contractual pressures and flow rates at the delivery points 120 integrated into the controller design.

In order to keep the computational costs within limits, operation can be carried out with finite prediction horizons. In order to prevent stability problems with this method, a method with guaranteed stability is used. In order to avoid control deviations at the delivery points, the MPC controller 100 which is described here is equipped with I-components 130.

In order to achieve the energy consumption of the compressors 112, the individual compressors have to be operated with the highest efficiency at the operating points. Since a plurality of compressors are normally implemented in a compressor station, it still has to be decided, moreover, in which configuration the compressors are operated (i.e. which compressors are engaged or disengaged). For the steady state and transient state (i.e. in the transition from one operating point to the next) the non-linear MPC 100 can be used. The non-linear MPC 100 which is described here closes this gap in which in each scanning step it determines the optimum compressor constellation (i.e. which compressors are engaged and disengaged) and the optimum operating points of the engaged compressors. Such systems can be referred to as hybrid since they have both binary and analog variables or states. In this case, consideration is to be given to the fact that the engaging and disengaging of compressors 112 requires more energy than the actual operation. The energy for the engaging and disengaging of the compressors is accepted as an additional term in the optimization criterion.

In order to compensate modelling inaccuracies and aging phenomena, the non-linear MPC controller 100 is adaptively constructed.

Compressors for gas as a rule are driven either by electric motors or gas turbines. The principle which is put forward can be used for both drive variants. In the case of the drive by means of gas turbines, consideration only needs to be given during the modelling and the optimization to the fact that some of the gas transported via the pipeline is used for driving.

The model-predictive controller which is described here calculates the desired values for the individual drives and forwards these to local station controls. Local station controls and drive controls inclusive of open-loop and closed-loop control logic are necessary in order to react to fast events, such as a breakdown. On account of the high computational cost, model-predictive controllers may not be suitable, or suitable only to a limited extent, for controlling fast processes and for reacting to fast events.

Using a hybrid non-linear model-predictive controller 100 with I-components and integrated anti-surge control for an oil or gas pipeline can provide the following advantages:

as a result of taking into consideration non-linearities, an improved optimum is achieved and consequently the energy consumption is reduced even further below the given limits than in the case of linear MPC methods. Since the non-linear limits are taken into consideration without linearization in the controller design, the safety margins to the limits can be reduced and as a result better optimization results can possibly be achieved.

with the introduction of I-components, control deviations at the delivery points are avoided.

the integration of "anti-surge" into the MPC method can make a saving on the anti-surge control and can be replaced by safety valves and safety switches.

the compressor constellation is optimized not only in the steady state but also in the transient state. As a result, the energy consumption of the compressor station is further reduced.

a separate external optimizer for the compressor constellation becomes superfluous.

Up to now, only the applicability of the invention for gas pipelines has been described. The same also basically applies to oil pipelines. Instead of compressors, in this case oil pumps are applicable. Therefore, the controller 100 which is described above can also be used for oil pipelines if the compressor characteristics are replaced by the pump characteristics. In the case of oil pipelines, in contrast to gas pipelines, not only the oil pump characteristics are to be taken into consideration but also the different characteristics of the fluid.

The invention claimed is:

1. A method executing software instructions stored in a memory for the open-loop controlling of a fluid conveyor for conveying a fluid inside a fluid line, the method comprising:
   obtaining information about a desired flow volume of the fluid inside the fluid line; determining an energy consumption of the fluid conveyor during operation within a working range of the fluid conveyor;
   open-loop controlling of the fluid conveyor with regard to a generated flow of the fluid based on the information about the desired flow volume of the fluid inside the fluid line in such a way that the desired flow volume of the fluid is achieved and the energy consumption which is required for this is minimized, wherein the fact that the working range of the fluid conveyor is restricted by a non-linear limit is taken into consideration during the open-loop controlling, wherein the working range is defined by a set of pairs of a flow volume and a ratio of a pressure at an inlet and at an outlet of the fluid conveyor, wherein the set of pairs is limited by at least one curved characteristic line; and
   obtaining information about an actual flow volume of the fluid inside the fluid line, wherein the open-loop controlling of the fluid conveyor is also based on the information about the actual flow volume of the fluid at the delivery points inside the fluid line.

2. The method as claimed in claim 1, further comprising:
modelling of the flow of the fluid through the fluid line and of the pressure of the fluid inside the fluid line, wherein the open-loop controlling of the fluid conveyor is also based on the modelling of the flow of the fluid through the fluid line.

3. The method as claimed in claim 2, wherein the flow of the fluid through the fluid line is modelled using a non-linear differential equation.

4. The method as claimed in claim 2, wherein the open-loop controlling of the fluid conveyor is also based on a fluid volume difference between the desired flow volume and the actual flow volume.

5. The method as claimed in claim 4,
wherein the information about the desired flow volume is obtained over a time period and the information about the actual pressure and the actual flow volume is obtained over the time period,
wherein the pressure difference and/or the flow volume difference over the time period is summed in order to obtain a pressure difference sum and/or a flow volume difference sum, wherein the open-loop controlling of the fluid conveyor is also based on the pressure difference sum and/or the flow volume difference sum.

6. The method as claimed in claim 1, wherein the determining of the energy consumption of the fluid conveyor includes determining the energy consumption of the fluid conveyor during engagement and/or disengagement.

7. The method as claimed in claim 1, wherein a distance between the fluid conveyor and a point along the fluid line at which the desired flow volume is to be achieved is taken into consideration.

8. The method as claimed in claim 1,
wherein at least one secondary condition of a set of secondary conditions is taken into consideration, wherein the set of secondary conditions comprises:
avoiding a pressure in the fluid line which lies above a maximum line pressure;
avoiding a pressure in the fluid conveyor which lies above a maximum conveyor pressure;
distancing of the working point of the fluid conveyor from a limit line of the working range which especially limits the working range of flow volumes which lie below the working range.

9. The method as claimed in claim 1, further comprising:
obtaining further information about the further desired flow volume of the fluid, wherein the desired flow volume is different from the further desired flow volume, wherein the open-loop controlling of the fluid conveyor is also based on the further desired flow volume.

10. The method as claimed in claim 1,
wherein the fluid is a gas and the fluid conveyor is a compressor.

11. The method as claimed in claim 1, wherein the fluid is an oil and the fluid conveyor is a pump.

12. The method as claimed in claim 1,
wherein the obtaining of information about the desired flow volume of the fluid inside the fluid line comprises obtaining information about a desired flow volume of the fluid at a plurality of points inside the fluid line,
wherein the method further comprises:
determining an energy consumption of at least one further fluid conveyor during operation within a further working range of the further fluid conveyor;
open-loop controlling of the fluid conveyor and/or of the at least one further fluid conveyor with regard to a generated flow of the fluid based on the information about the desired flow volume of the fluid at the plurality of points of the fluid line in such a way that desired flow volumes of the fluid are achieved at the plurality of points and the energy consumption which is required for this is minimized.

13. The method as claimed in claim 1, wherein the flow of the fluid is expressed in an energy flux volume.

14. A device for the open-loop controlling/closed-loop controlling of a fluid conveyor for conveying a fluid inside a fluid line, comprising:
a first input for obtaining information about a desired flow volume of the fluid inside the fluid line;
a second input for obtaining information about an actual flow volume of the fluid inside the fluid line;

a determination module stored in a memory for determining an energy consumption of the fluid conveyor during operation within a working range of the fluid conveyor; and an open-loop control module stored in a memory for the open-loop controlling of the fluid conveyor with regard to a generated flow of the fluid based on the information about the desired flow volume of the fluid inside the fluid line in such a way that the desired flow volume of the fluid is achieved and the energy consumption which is required for this is minimized, wherein the open-loop controlling of the fluid conveyor is also based on the information about the actual flow volume of the fluid at the delivery points inside the fluid line;

wherein the fact that the working range of the fluid conveyor is restricted by a non-linear limit is taken into consideration during the open-loop controlling, wherein the working range is defined by a set of pairs of a flow volume and a ratio of a pressure at an inlet and at an outlet of the fluid conveyor, wherein the set of pairs is limited by at least one curved characteristic line.

* * * * *